United States Patent

[11] 3,593,961

| [72] | Inventor | Anthony F. Stewart<br>12091 Nieta Drive, Garden Grove, Calif. 92640 |
|---|---|---|
| [21] | Appl. No. | 826,386 |
| [22] | Filed | May 21, 1969 |
| [45] | Patented | July 20, 1971 |

[54] FAUCET FOR PRESSURIZED FLUIDS
11 Claims, 3 Drawing Figs.

[52] U.S. Cl. .............................................. 251/349, 251/341
[51] Int. Cl. ............................................... F16k 31/58
[50] Field of Search ................................... 251/341, 346, 349, 350, 351, 348, 354

[56] References Cited

UNITED STATES PATENTS

| 1,275,783 | 8/1918 | Steinmetz | 251/348 |
| 1,593,968 | 7/1926 | Edling | 251/354 |
| 2,667,324 | 1/1954 | Hansen | 251/341 X |
| 2,901,213 | 8/1959 | Osrom et al. | 251/352 |
| 3,047,239 | 7/1962 | Canavan | 251/349 X |
| 3,198,210 | 8/1965 | Lewis | 251/354 X |
| 3,357,604 | 12/1967 | Barker | 251/349 X |
| 3,380,478 | 4/1968 | Garrison | 251/352 X |

FOREIGN PATENTS

| 622,336 | 2/1927 | France | 251/346 |

Primary Examiner—Samuel Scott
Attorney—Gausewitz and Carr

ABSTRACT: A faucet which comprises a valve and a spout, the spout being adapted to be shifted to different positions effecting opening and closing of the valve. The spout is connected to the ball portion of a ball-and-socket joint, and in communication with a diametrical passage or canal through the ball. A spherical plug is mounted in a cage adjacent the inlet end of the canal, so that the inlet fluid pressure may force the plug against the inlet to block the same when the ball is in a shutoff position at which such inlet is aligned with the cage. When the spout is actuated to pivot the ball to a flow position, at which the ball inlet is not aligned with the cage, the plug is rolled off the ball and therefore may not block the canal.

PATENTED JUL20 1971

3,593,961

INVENTOR.
ANTHONY F. STEWART
BY
Gausewitz & Carr
ATTORNEYS

FAUCET FOR PRESSURIZED FLUIDS

BACKGROUND OF THE INVENTION

1. Field of the Invention

This invention relates to the field of faucets for pressurized fluids.

2. Description of the Prior Art

In prior art faucets, the fluid flow is usually regulated by a knob or handle that is independent of and separate from the spout of the faucet. To turn the faucet on or off, one must rotate the knob to its open or closed position. The knob of the faucet must be spaced away from other objects or it becomes difficult to properly grasp and operate. Both the knob and the spout present obstacles to quick and easy cleaning of the faucet since they are irregularly shaped protuberances about the sink or cabinet.

In addition to the above, prior art faucets are comprised of many working parts that are usually quite bulky and heavy. These parts are also costly to manufacture and assemble, and when broken are difficult and expensive to repair or replace. The inner parts of prior art faucets are also subject to scaling and corrosion which can cause the faucet to operate poorly.

The spouts of prior art faucets may normally pivot about one axis only, or else may not pivot at all. Therefore, the stream of water emanating from the spout may only be directed, if at all, in a limited manner. At least one attempt has previously been made to overcome this limiting feature and also to provide a faucet that is actuated by moving its spout. Such prior art faucet is described in U.S. Pat. No. 656,759, issued Aug. 28, 1900, but the construction taught by such patent is characterized by various deficiencies including tendency toward leakage, necessity for a spring, high expense of manufacture, and tendency to wear excessively. Other patents include U.S. Pat. Nos. 3,198,210; 3,322,152 and 3,380,478.

SUMMARY OF THE INVENTION

The present invention comprises a faucet the valve portion of which is actuated by shifting the spout or outlet tube portion thereof. The valve portion includes a relatively large spherical element which is rotatably and sealingly seated in the casing of the valve, in ball-and-socket relationship. The spout extends through an opening in the valve casing and communicates with a passage or canal that extends through the spherical element. Furthermore, the spout connects to the spherical element, so that the latter may be operated by manual shifting of the spout.

Positioned, as by a cage, adjacent the inlet side of the spherical element is a ball-shaped plug element. Such plug sealingly seats on the inlet end of the canal in the spherical element when such inlet is adjacent the cage. When the spherical element is rotated so that the canal inlet is not adjacent the cage, the plug element is rolled off the spherical element and therefore no longer seats on the canal inlet. Accordingly, when the spherical element is in the latter position, fluid can flow into the canal and out through the spout.

The valve casing opening through which the spout extends is a slot adapted to guide the spout (and thus the large ball) along a predetermined path, but to permit the spout to rotate sideways in order to direct the stream of water. The large ball is seated on parts of the cage, preferably on a sealing ring thereon, to enhance the seal and also cause smooth operation of the faucet.

DESCRIPTION OF THE PREFERRED EMBODIMENT

Figure 1:
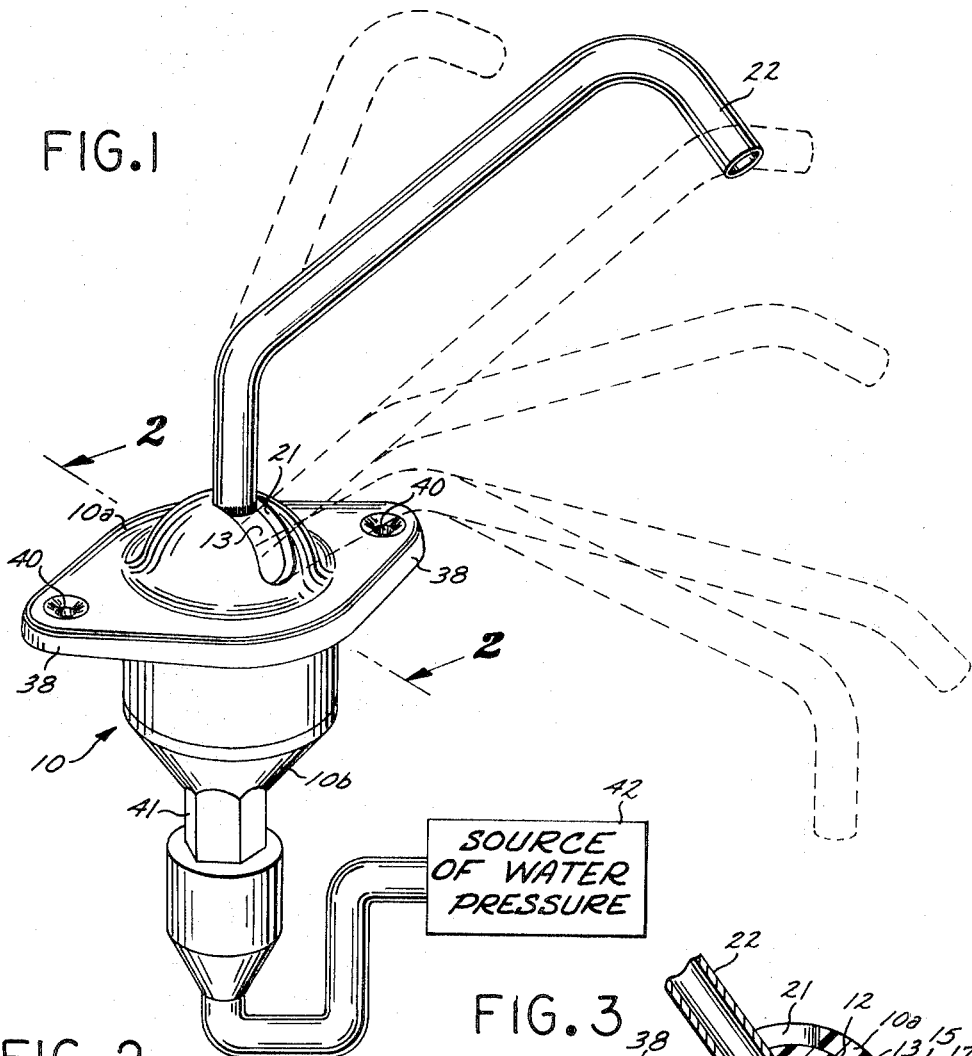
FIG. 1 is a perspective view of the faucet, showing the same as connected to a suitable source of water pressure.

The faucet includes an outer casing 10 which defines a valve chamber 11. The casing is formed of two cup-shaped parts 10a and 10b having cylindrical sidewalls which are threadedly associated with each other in partially telescoped condition. Casing 10a is dome shaped and defines a seat 12 for a complementary-sized spherical (ball) element 13. Element 13 is pivotally mounted in ball-and-socket relationship, not only by seat 12 but also by upper and lower sealing rings 15 and 16, respectively. Such rings are preferably O-rings.

The upper sealing ring 15 is seated in a groove 17 formed over the lip of lower section 10b between the two parts 10a and 10b of casing 10. The lower sealing ring 16 is positioned against ball 13 and against the inner surface of the cylindrical sidewall of the casing section 10b. Such lower ring rests on the upper edges of struts or webs 20 which extend radially inwardly from the casing section 10b and aid in defining a plug ball cage as set forth below. Sealing rings 15 and 16 securely position the spherical element 13 in the upper portion of chamber 11 and prevent any fluid from passing between the outer surface of sphere 13 and the inner walls of casing 10. Upper sealing ring 15 performs an additional function of preventing any fluid from passing through the threaded connection between the two casing parts 10a and 10b. Lower sealing ring 16 facilitates rotation of ball element 13 in a smooth manner.

The faucet includes an outlet port 21 located in the dome-shaped upper wall of the casing section 10a, such port being an arcuate slot as illustrated. A spout 22 extends inwardly through the outlet port 21 and into a passage or canal 23 in the spherical element 13. The spout 22 extends in press fit sealing relationship through the center of the spherical element 13 and abuts against a shoulder 24 where the diameter of the canal 23 is reduced. Any liquid which passes through the spout must first flow through passage 23. Pivoting of the ball 13 is effected by manually shifting the spout 22 in slot 21, not only to operate the valve but also to direct the stream of water therefrom and as described hereinafter.

A small spherical plug element of plug ball 30 is positioned below the larger spherical element 13 and may have limited lateral movement between the parallel vertical edges of the cage-forming webs 20 in the casing 10. The webs may be four in number, and spaced 94° from each other. The plug ball 30 also enjoys limited vertical movement between the lower surface of spherical element 13 and the bottom 31 of chamber 11. Thus, the plug ball 30 is loosely confined in a cage, and the cage is such as to permit flow of water therethrough in any direction.

The faucet includes an inlet passage 32 positioned in the lower part of the casing 10 directly below plug ball 30. The lower exterior surface 33 of the faucet is threaded to provide a suitable means of connecting the faucet to a fluid pressure source, such as the one indicated schematically at 42.

Figure 2:
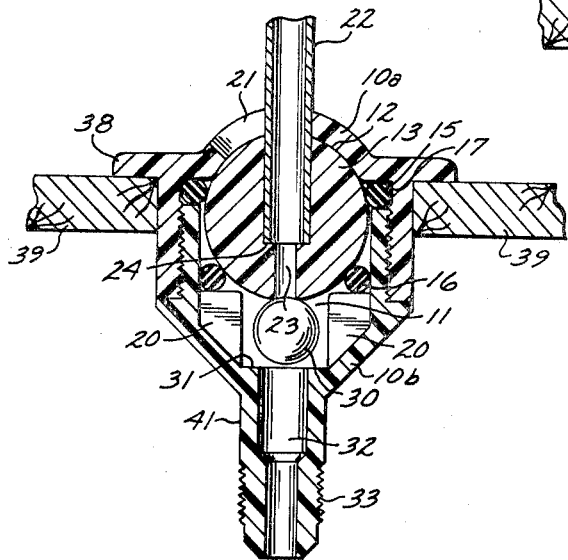
FIG. 2 is a fragmentary longitudinal sectional view taken along line 2-2 of FIG. 1, showing the valve in its closed position.

The plug ball 30 is directly between inlet 32 and the lower or inlet end of passage 23 when the valve is in the open position of FIG. 2. Therefore, pressures are fully equalized around the ball 30, and the velocity of the inflowing water pushes ball 30 against ball 13.

When a pressurized fluid is introduced into the faucet through inlet passage 32, a slight amount of water may flow initially around the plug ball 30 in the lower portion of the chamber 11, enter the canal 23 in the spherical element 13, and flow out of the faucet through spout 22. The upward movement of the water in chamber 11 causes (as indicated above) the plug ball 30 to move upwardly and rest against the lower surface of spherical element 13. When the axis of the canal 23 of spherical element 13 is substantially aligned with the longitudinal axis of the faucet, as shown in FIG. 2, the plug ball 30 seats against the inlet portion of the canal 23 and thereby prevents the flow of fluid through the faucet.

Figure 3:
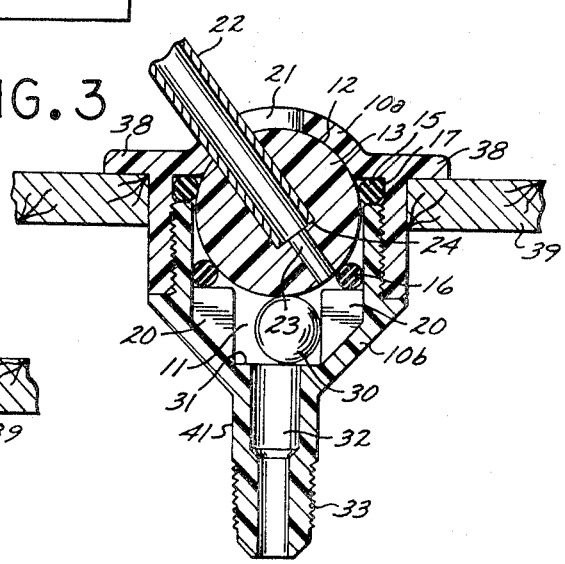
FIG. 3 is a view corresponding to FIG. 2 but showing the valve in its open position.

During periods when the axis of canal 23 is not substantially aligned with the longitudinal axis of the faucet, as shown in FIG. 3, plug ball 30 cannot seat against the inlet portion of canal 23 and fluid flow through the faucet is permitted. During pivoting of canal 23 (in response to grasping and pivoting of spout 22) out of alignment with the longitudinal axis of the faucet, plug ball 30 remains seated on the inlet portion of canal 23 until the ball 30 contacts a vertical inner edge of a strut 20. Further rotation of the canal 23 causes the inlet portion of such canal to move away from plug ball 30, shown in FIG. 3, so that fluid flow through the valve commences.

When the axis of canal 23 is again substantially aligned with the longitudinal axis of the faucet, plug ball 30 will again seat on the inlet portion of the canal 23 and prevent fluid flow through the faucet. The lateral movement allowed plug ball 30 between the inner vertical edges of struts 20 allows the plug ball 30 to remain seated on the inlet portion of the canal 23 when the axis of the canal 23 is slightly misaligned from the longitudinal axis of the faucet. This makes the exact "off" position of the valve noncritical. As long as the axis of canal 23 is substantially or generally aligned with the longitudinal axis of the faucet, the faucet remains in its closed position.

The plug ball 30 is formed of a suitable soft material such as soft rubber. Therefore, when the valve is closed as shown in FIG. 2, the fluid pressure forces part of the rubber into the lower end of passage 23. The plug ball therefore seats on the annular valve seat formed by a portion of ball 13 around passage 23, with a highly effective sealing action that positively prevents dripping.

Despite long-continued use of the present faucet, there is no substantial wear on plug ball 30. This is because such ball does not slide off ball 13 when the latter is shifted to the open position of FIG. 3. Instead, ball 30 rolls off ball 13 with little or no rubbing (and thus wearing) action.

The present valve is much simpler and more economical than prior art valves, in that no springs, plungers, etc., are required. Also, the present valve has better sealing and wearing characteristics than do prior art valves.

The outlet port 21 in casing 10 is shaped as an elongated slot so as to allow the spout 22 to pivot about the center of spherical element 13 and move, in a plane, from an initial position in alignment with the longitudinal axis of the faucet to a position approximately 50° therefrom. The slot is employed because it will automatically position the spout 22 in alignment with the longitudinal axis of the faucet when the spout 22 is moved toward the upper end of the slot. When the spout 22 is positioned in or near the upper end of the slot 21, the faucet will be closed or shut off.

The spout 22 and the spherical element 13 can also rotate conjointly about the axis of canal 23 without affecting the fluid flow through the faucet. This rotation can occur when the faucet is in an open or closed position because the fluid flow through the faucet is affected only the misalignment, if any, between the longitudinal axis of the faucet and the axis of the faucet and the axis of canal 23. When spout 22 is provided with one or more elbows, as shown in FIG. 1, fluid may be discharged from the faucet in a large number of directions. A few of the possible positions of spout 22 are shown in dashed lines in FIG. 1.

The valve casing 10 includes a flanged portion 38 that extends radially outwardly from casing 10. The flanged portion 38 seats on a cabinet top 39 and is attached to the cabinet top 39 by means of fasteners which extend through holes 40 in the flanged portion 38. The exterior portion 41 of the casing 10, adjacent the threaded portion 33, is hexagonally shaped so as to provide a convenient wrench hold for connecting the two pieces of the casing 10 together, or for connecting the faucet to the source of fluid pressure 42.

All of the parts of the faucet, with the possible exception of spout 22 which may be metal, are formed economically of plastic as by injection molding. The sealing rings 15 and 16 may be formed of synthetic rubber or other suitable elastomeric substance.

The faucet is readily assembled, in a few seconds time, by merely seating the sealing rings, inserting the balls, and threading together the casing sections 10a and 10b.

I claim:

1. A faucet, which comprises:
   a valve casing adapted to be mounted on a cabinet top adjacent a sink or the like,
   said casing having a slot formed in the upper wall thereof,
   a relatively large ball rotatably mounted in said casing beneath said slot,
   sealing means to prevent passage of liquid around said large ball to said slot from the lower region in said casing beneath said large ball,
   a spout fixedly connected to said large ball to rotate the same,
   said spout extending through said slot for guiding by the casing portion which defines said slot, thus reducing the freedom of rotation of said large ball,
   said spout communicating through passage means in said large ball with said lower casing region,
   the portion of said large ball which encompasses the lower end of said passage means forming an annular valve seat,
   a plug movably mounted in said lower casing region in floating relationship and adapted to seat sealingly on said valve seat,
   means to confine movement of said plug,
   said confining means being so located that said plug is registered with said seat for seating thereon in response to liquid pressure when said spout is extended through one portion of said slot, said confining means also being so located that said plug may not move with said seat to a position achieved by said seat when said spout is manually shifted to a slot portion remote from said one portion thereof, whereby said plug is then shifted off said seat by said confining means, and
   inlet means to introduce liquid into said lower casing region and under sufficient pressure to effect sealing seating of said plug on said seat, in the absence of spring pressure, when said spout is in said one portion of said slot,
   said lower casing region and said confining means being so constructed that said liquid may flow to and through said valve seat when said spout is shifted to said remote slot portion.

2. The invention as claimed in claim 1, in which said plug is a small ball.

3. The invention as claimed in claim 2, in which said confining means is sufficiently large to permit limited lateral movement of said small ball, thereby rendering relatively noncritical said position of said spout in said one slot portion.

4. The invention as claimed in claim 2, in which said small ball is not spring biased, and is not connected to any plunger.

5. The invention as claimed in claim 2, in which said means to introduce liquid is directed toward said valve seat when said spout is in said one slot portion, and in which said confining means is then located between said inlet means and said valve seat whereby the velocity of the incoming liquid aids in moving said small ball against said valve seat.

6. The invention as claimed in claim 2, in which said small ball is formed of elastomeric material.

7. The invention as claimed in claim 2, in which said confining means comprises a plurality of webs formed in said casing beneath said large ball and adapted to aid in rotatably mounting said large ball in said casing.

8. The invention as claimed in claim 7, in which a sealing ring is seated on said webs to provide rotatable support for said large ball, said sealing ring sealingly contacting said large ball and an interior wall of said casing and forming at least part of said sealing means.

9. The invention as claimed in claim 8, in which said casing comprises upper and lower telescopically related sections threaded to each other, and in which said sealing means additionally comprises a sealing ring seated between the upper rim of said lower section and an adjacent region of said upper section, said sealing ring being at all times in sealing contact with said large ball.

10. A valve for pressurized fluids, comprising:
a casing which defines a chamber having an inlet and an outlet,
a rotatable element seated in said chamber in such manner as to prevent any fluid from passing to the exterior of said casing along a path between said casing and the outer surface of said rotatable element,
   said rotatable element having a passage or canal therethrough,
   said rotatable element being a sphere,
actuator means to rotate said rotatable element,
   said actuator means being a spout rigidly connected to said rotatable element and communicating with said passage,
means to define an annular valve seat on said rotatable element and around the inlet end of said passage,
a ball-shaped plug element positioned between said rotatable element and said inlet,
   said plug element sealingly engaging said valve seat when said rotatable element is in one position,
   thereby blocking flow of fluid through said passage, and
means to effect rolling of said plug element off said valve seat in response to shifting of said rotatable element to another position, thereby allowing fluid to flow through said passage.

11. A faucet, which comprises:
a valve casing adapted to be mounted on a cabinet top adjacent a sink or the like,
a relatively large rotatable element rotatably mounted in said casing,
sealing means to prevent passage of liquid around said rotatable element from a predetermined region in said casing,
a spout fixedly connected to said rotatable element to rotate the same,
   said spout communicating through passage means in said rotatable element with said predetermined casing region,
   the portion of said rotatable element which encompasses the inner end of said passage means forming a valve seat,
a relatively small plug movably mounted in said predetermined casing region in floating relationship and adapted to seat sealingly on said valve seat,
means to limit movement of said plug,
   said limiting means being so located that said plug may register with said seat for seating thereon in response to liquid pressure when said spout is in at least one position,
   said limiting means also being so located that said plug may not move with said seat to a position achieved by said seat when said spout is manually shifted to a predetermined other position remote from said one position, whereby said plug is then shifted off said seat by said limiting means, and
inlet means to introduce liquid into said predetermined casing region and under sufficient pressure to effect sealing seating of said plug on said seat, in the absence of spring pressure, when said spout is in said one position,
   said predetermined casing region and said limiting means being so constructed that said liquid may flow to said valve seat and through said passage and said spout when said spout is shifted to said other position.